US006975753B2

(12) United States Patent
Matsuura et al.

(10) Patent No.: US 6,975,753 B2
(45) Date of Patent: Dec. 13, 2005

(54) IMAGE PROCESSING APPARATUS, IMAGE PROCESSING METHOD, PROGRAM FOR IMPLEMENTING SAID METHOD, AND STORAGE MEDIUM THEREFOR

(75) Inventors: Tomohiko Matsuura, Tochigi (JP); Hiroyuki Shinbata, Tochigi (JP); Makoto Sato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 720 days.

(21) Appl. No.: 09/948,660

(22) Filed: Sep. 10, 2001

(65) Prior Publication Data

US 2002/0031247 A1    Mar. 14, 2002

(30) Foreign Application Priority Data

Sep. 13, 2000 (JP) .............................. 2000-278295
Jan. 11, 2001 (JP) .............................. 2001-004077

(51) Int. Cl.[7] .............................................. G06S 9/00
(52) U.S. Cl. ..................................... 382/132; 382/173
(58) Field of Search ............................... 382/132, 131, 382/270–275, 240, 248, 73, 261–265

(56) References Cited

U.S. PATENT DOCUMENTS

| 4,755,747 A | | 7/1988 | Sato ........................... 324/158 |
| 5,305,193 A | | 4/1994 | Shinnaka et al. ........... 364/151 |
| 5,602,589 A | * | 2/1997 | Vishwanath et al. ... 375/240.11 |
| 5,752,040 A | | 5/1998 | Kaneko et al. ............. 395/712 |
| 6,166,505 A | | 12/2000 | Sato .......................... 318/568.1 |
| 6,236,757 B1 | * | 5/2001 | Zeng et al. .................. 382/240 |
| 6,463,181 B2 | * | 10/2002 | Duarte ......................... 382/254 |
| 6,741,739 B1 | * | 5/2004 | Vincent ....................... 382/191 |

OTHER PUBLICATIONS

Chang et al, "Texture Analysis and Classification with Tree-Structured Wavelet Transform", IEEE Transactions on Image Processing, vol. 2, No. 4, Oct. 1993) discloses a method for performing texture analysis using wavelets.*

* cited by examiner

*Primary Examiner*—Brian Werner
*Assistant Examiner*—Christopher Lavin
(74) *Attorney, Agent, or Firm*—Fitzpatrick, Cella, Harper & Scinto

(57) ABSTRACT

In order to eliminate noise from an X-ray image by obtaining transform coefficients of a wavelet transform based upon information contained in tile-by-tile image data and obtaining image data based upon these transform coefficients, the entirety of a pre-processed original image is segmented into a plurality of tiles (S301). Wavelet transform coefficients of each tile obtained by segmentation are output (S302). Each tile is subjected to texture analysis and the results of analysis are output (S303). Next, a coefficient conversion is applied to the wavelet transform coefficients of each tile based upon the results of analysis (S304). High-frequency components among the transform coefficients are subjected to coefficient conversion. Next, an inverse discrete wavelet transform is applied to the wavelet transform coefficients of each area that has undergone conversion, whereby an image from which noise has been eliminated is output (S306).

34 Claims, 15 Drawing Sheets

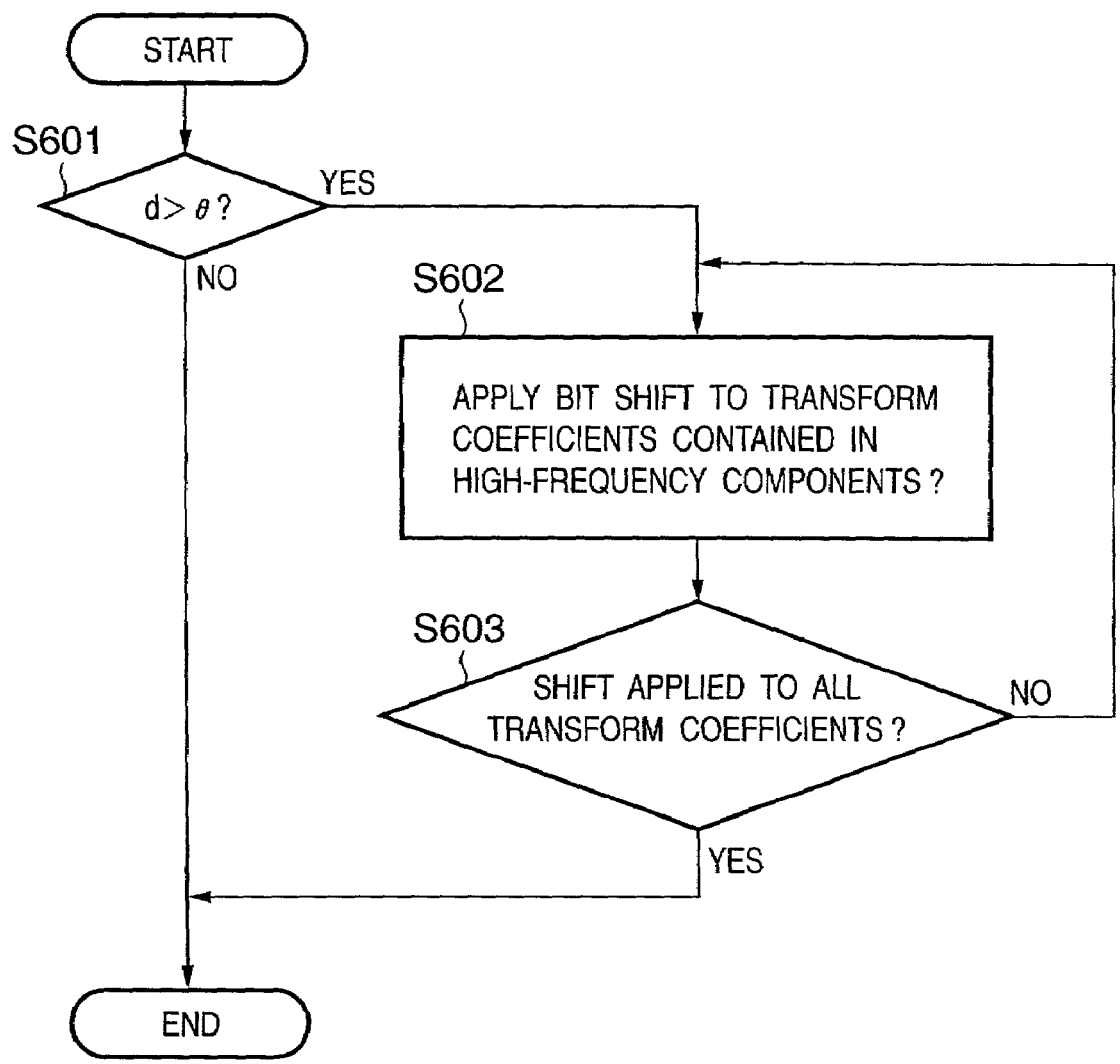

IMAGE PROCESSING APPARATUS, IMAGE PROCESSING METHOD, PROGRAM FOR IMPLEMENTING SAID METHOD, AND STORAGE MEDIUM THEREFOR

FIELD OF THE INVENTION

This invention relates to an image processing apparatus, image processing method, program and storage medium for correcting image data.

BACKGROUND OF THE INVENTION

By virtue of recent advances in digital technology, it has become possible to convert a radiation image to a digital image signal, subject the digital image signal to image processing and display the image on a CRT or print out the image using a printer. In photography for acquiring the radiation image, it is desired that the X-ray dose at the time of photography be small in view of the effects of X-rays upon the patient. However, it is known that an image captured with a reduced X-ray dose contains a large quantity of quantization noise, and there is the possibility that such quantization noise will be a hindrance to diagnosis. For this reason, processing for eliminating such noise has been studied. Examples are noise elimination processing that uses a simple median filter, and a method (referred to as "filter processing") of eliminating noise by extracting high-frequency components using a smoothed image. In recent years, consideration has been given to multiplexed frequency processing for dividing an input image into a plurality of frequency bands and applying independent processing on a per-frequency-band basis to thereby eliminate noise.

With filter processing for eliminating noise by extracting high-frequency components using a smoothed image, a single frequency band is used. In a case where noise components are distributed over a wide frequency band, therefore, noise cannot be eliminated effectively. In order to avoid this, multiple filters having different sizes (namely different frequencies) are utilized simultaneously. However, this leads to a major increase in the cost of calculations necessary for processing. In addition, in order that the frequency characteristics of the filters must be optimized for eliminating noise, adjustment of filter size in accordance with the subject is essential. The problem that arises as a result is a decline in general versatility.

The above-mentioned problems are largely mitigated by using multiplexed frequency processing for noise elimination. However, since data in the same image is processed uniformly, it is difficult to optimally process areas of good transparency and areas of poor transparency as well as areas with much fine texture and areas in which almost no texture exists.

The present invention has been made in consideration of the above problem, and has as its object to eliminate a noise by acquiring the transform coefficient of wavelet transform based on the information of the image data in a rectangle area, acquiring the image data base on the transformation coefficient.

SUMMARY OF THE INVENTION

In order to achieve the object of the present invention, for example, an image processing apparatus of the present invention has the following arrangement.

There is provided segmentation means for segmenting image data into rectangular areas; image analyzing means for obtaining pixel information based upon image data within rectangular areas obtained by the segmentation means; wavelet transform means for obtaining transform coefficients by applying a wavelet transform to image data within the rectangular areas obtained by the segmentation means; correction means for applying a correction to transform coefficients on a per-rectangular-area basis in accordance with the pixel information obtained by the image analyzing means; and inverse wavelet transform means for applying an inverse wavelet transform to all transform coefficients inclusive of the transform coefficients corrected by the correction means.

In order to achieve the object of the present invention, for example, an image processing apparatus of the present invention has the following arrangement.

There is provided segmentation means for segmenting image data into rectangular areas; image analyzing means for obtaining pixel information based upon image data within rectangular areas obtained by the segmentation means; storage means for storing a plurality of wavelet transform filters having different characteristics; selection means for selecting wavelet transform filters on a per-rectangular-area basis from the storage means in accordance with the pixel information obtained by the image analyzing means; wavelet transform means for obtaining transform coefficients by applying a wavelet transform, using the wavelet transform filter selected by the selection means, to image data within the rectangular areas obtained by the segmentation means; and inverse wavelet transform means for applying an inverse wavelet transform to transform coefficients obtained by the wavelet transform means.

In order to achieve the object of the present invention, for example, an image processing apparatus of the present invention has the following arrangement.

There is provided an image processing apparatus for applying image processing to an image containing a region of interest, comprising: segmentation means for segmenting an image into tiles of a prescribed size; frequency transform means for applying a frequency transform, which conforms to a proportion of the region of interest contained in a tile of interest, to the tile of interest; component transform means for applying a component transform to transform coefficients contained in the tile of interest that has been subjected to the frequency transform by the frequency transform means; and inverse frequency transform means for applying a transform, which is the inverse of the frequency transform by the frequency transform means, to the tile of interest that has been subjected to the component transform by the component transform means.

In order to achieve the object of the present invention, for example, an image processing apparatus of the present invention has the following arrangement.

There is provided an image processing apparatus for applying image processing to an image containing a region of interest, comprising: segmentation means for segmenting an image into tiles of a prescribed size; frequency transform means for applying a frequency transform to the tile of interest in accordance with a frequency transform schedule that conforms to a proportion of the region of interest contained in a tile of interest; component transform means for applying a component transform to transform coefficients contained in the tile of interest that has been subjected to the frequency transform by the frequency transform means; and inverse frequency transform means for applying a transform, which is the inverse of the frequency transform performed by the frequency transform means, to the tile of interest that has been subjected to the component transform by the component transform means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a flowchart of processing for executing coefficient conversion;

DESCRIPTION OF THE PREFERRED EMBODIMENTS

Preferred embodiments of the present invention will now be described in detail in accordance with the accompanying drawings.

[First Embodiment]

Figure 1:
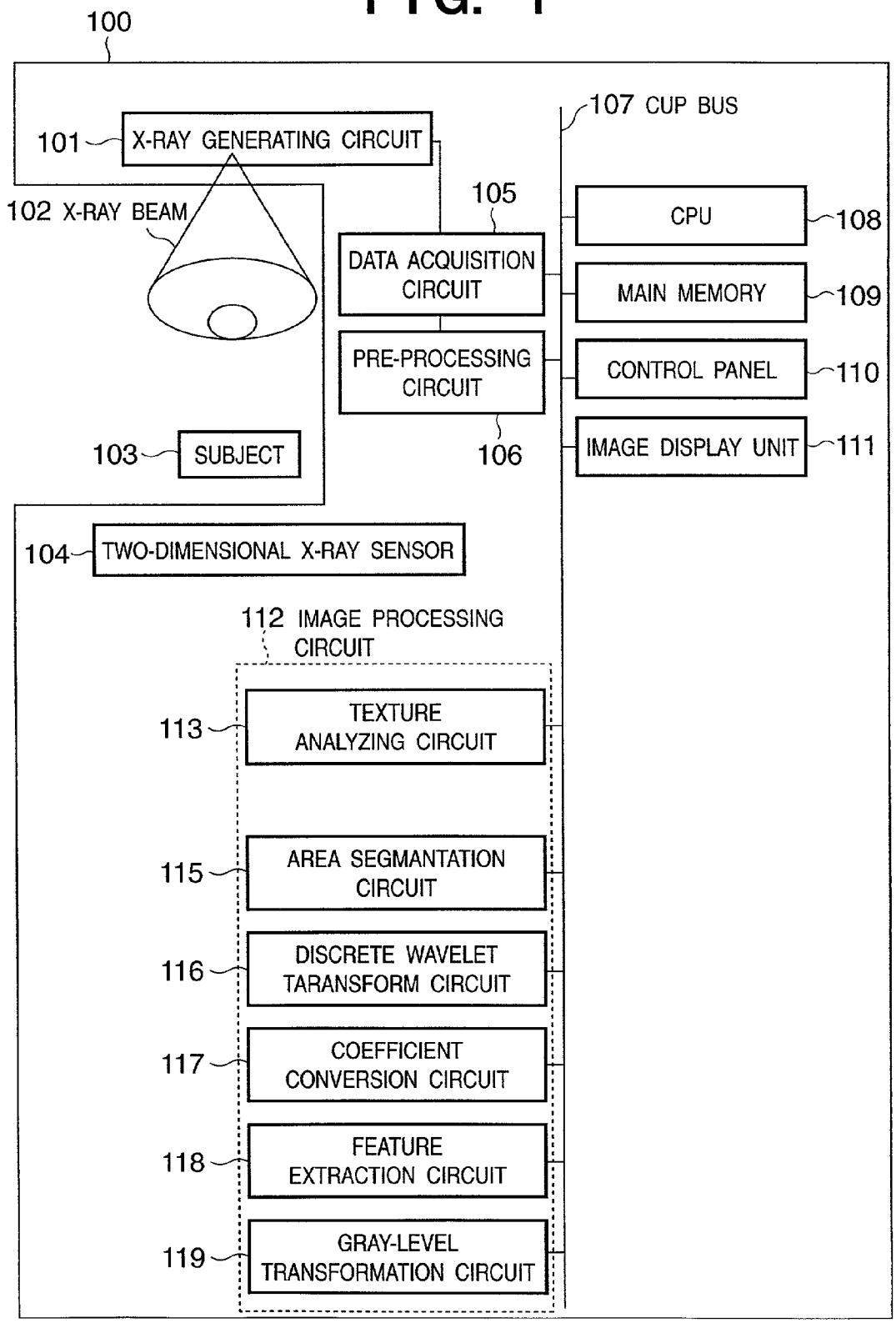
FIG. 1 is a block diagram illustrating the structure of an X-ray photography apparatus 100 serving as an image processing apparatus according to a first embodiment of the present invention.

FIG. 1 is a block diagram illustrating the structure of an X-ray photography apparatus 100 serving as an image processing apparatus according to a first embodiment of the present invention.

The X-ray photography apparatus 100 has a function for eliminating noise from a captured image and includes a preprocessing circuit 106, a CPU 108, a main memory 109, a control panel 110, an image display unit 111, and an image processing circuit 112. The image processing circuit 112 has a texture analyzing circuit 113, an area segmentation circuit 115, a discrete wavelet transform (DWT) circuit 116, a coefficient conversion circuit 117, a feature extraction circuit 118 and a gray-level transformation circuit 119. These circuits are capable of exchanging data with one another via a CPU bus 107.

The X-ray imaging apparatus 100 further includes a data acquisition circuit 105 connected to the preprocessing circuit 106, and a two-dimensional X-ray sensor 104 and X-ray generating circuit 101 connected to the data acquisition circuit 105. These circuits are also connected to the CPU bus 107.

Figure 2:
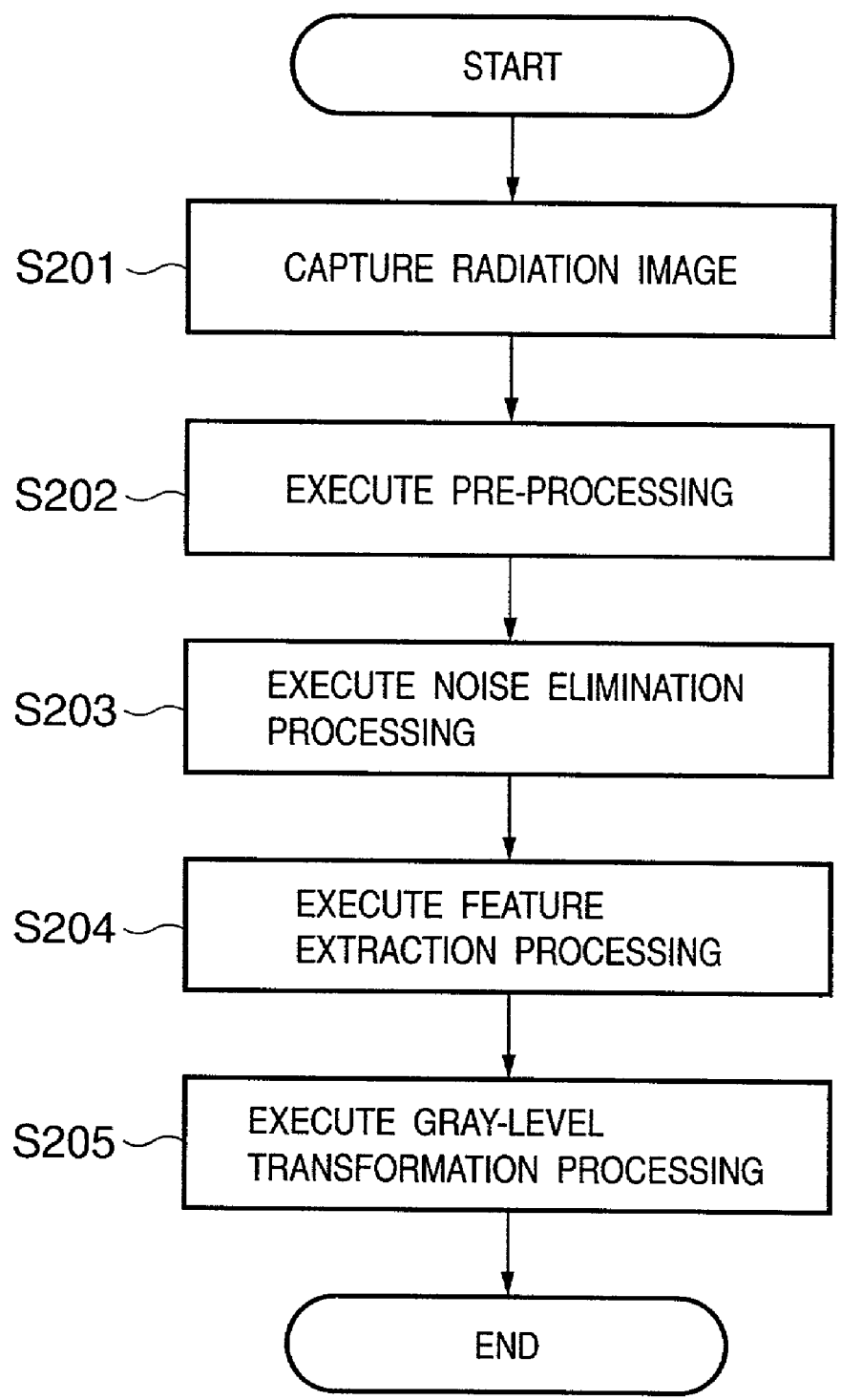
FIG. 2 is a general flowchart of a series of processes executed by the X-ray photography apparatus 100 senses the image of a subject 103 and executes a variety of image processing.

FIG. 2 is a general flowchart of a series of processes through which the X-ray photography apparatus 100 having the above-described components senses the image of a subject 103 and executes a variety of image processing described later. It is assumed that a program in accordance with the flowchart shown in FIG. 2 has been stored in the main memory 109 or in a ROM (not shown), and is read out and executed by the CPU 108. Various data necessary for processing by the CPU 108 also is stored in the main memory 109, which includes a work area for work performed by the CPU 108. The CPU 108 uses the main memory 109 to control the overall operation of the X-ray imaging apparatus 100 in accordance with operations performed at the control panel 110. The X-ray imaging apparatus 100 operates as set forth below by virtue of this control.

First, the X-ray generating circuit 101 emits an X-ray beam 102 toward the subject 103. The X-ray beam 102 emitted from the X-ray generating circuit 101 passes through the subject 103 while being attenuated and reaches the two-dimensional X-ray sensor 104. The latter outputs a signal representing the radiation (X-ray) image (step S201). The X-ray image output from the two-dimensional X-ray sensor 104 is assumed to be an image of the human body, by way of example.

The data acquisition circuit 105 converts the X-ray image output from the two-dimensional X-ray sensor 104 to an electric signal and applies the signal to the preprocessing circuit 106. The latter subjects the signal (X-ray image signal) from the data acquisition circuit 105 to preprocessing such as offset correction processing and gain correction processing (step S202). The X-ray image signal that has been subjected to preprocessing by the preprocessing circuit 106 is transferred as an original image to the main memory 109 and image processing circuit 112 via the CPU bus 107 under the control of the CPU 108.

The components constituting the image processing circuit 112 will now be described. The texture analyzing circuit 113 analyzes texture within rectangular areas in a radiation image, the area segmentation circuit 115 segments the radiation image into a plurality of rectangular areas, the discrete wavelet transform circuit 116 applies the rectangular areas to a discrete wavelet transform and obtains wavelet transform coefficients, and the coefficient conversion circuit 117 converts the wavelet coefficients in accordance with rules described later. Further, the image processing circuit 112 has the feature extraction circuit 118 for extracting features that are necessary for a gray-level transformation, and the gray-level transformation circuit 119 for performing a gray-level transformation in dependence upon the features obtained.

Figure 3:
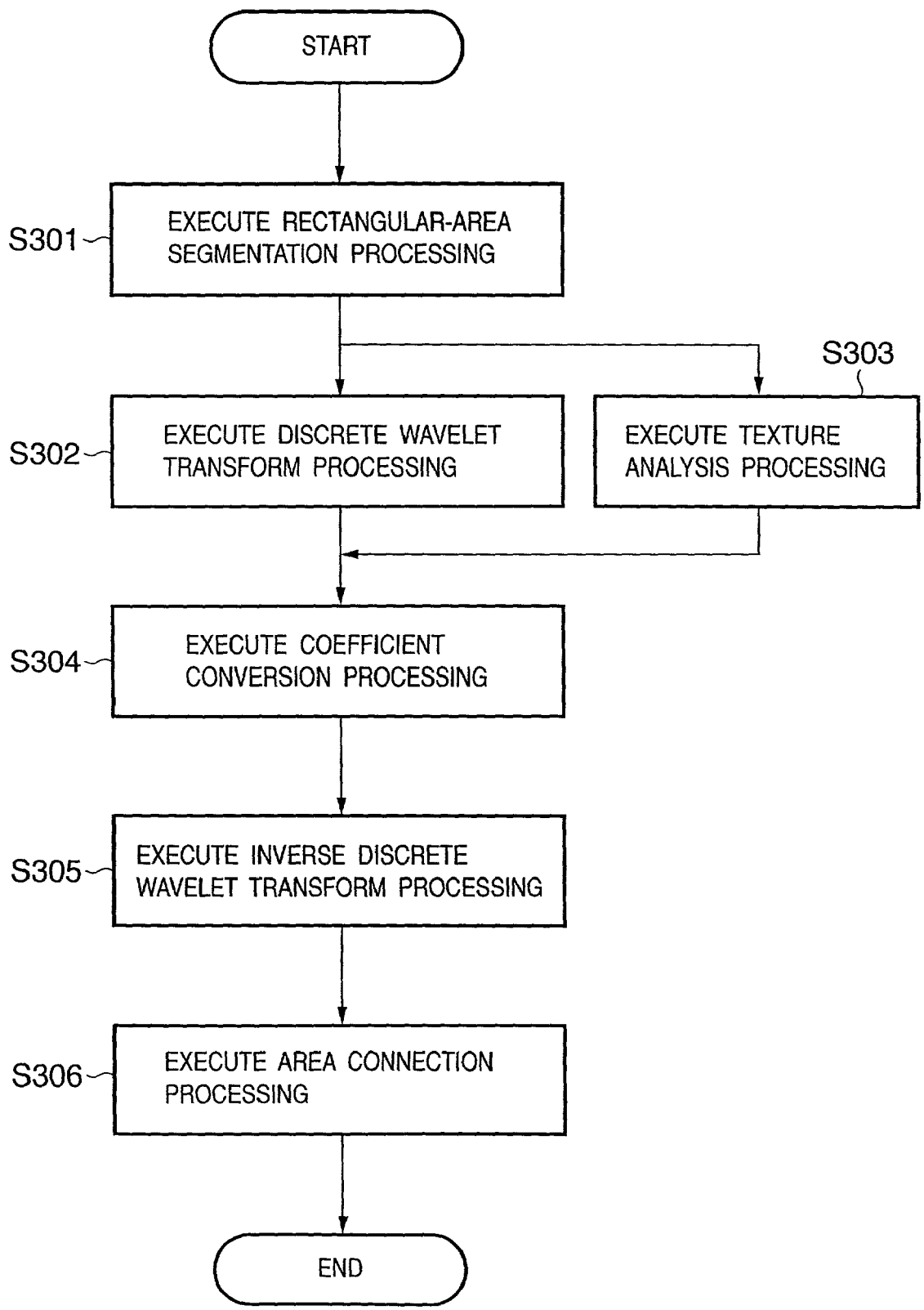
FIG. 3 is a flowchart of specific processing regarding noise elimination processing executed by an image processing circuit at a step S203.
Figure 4:
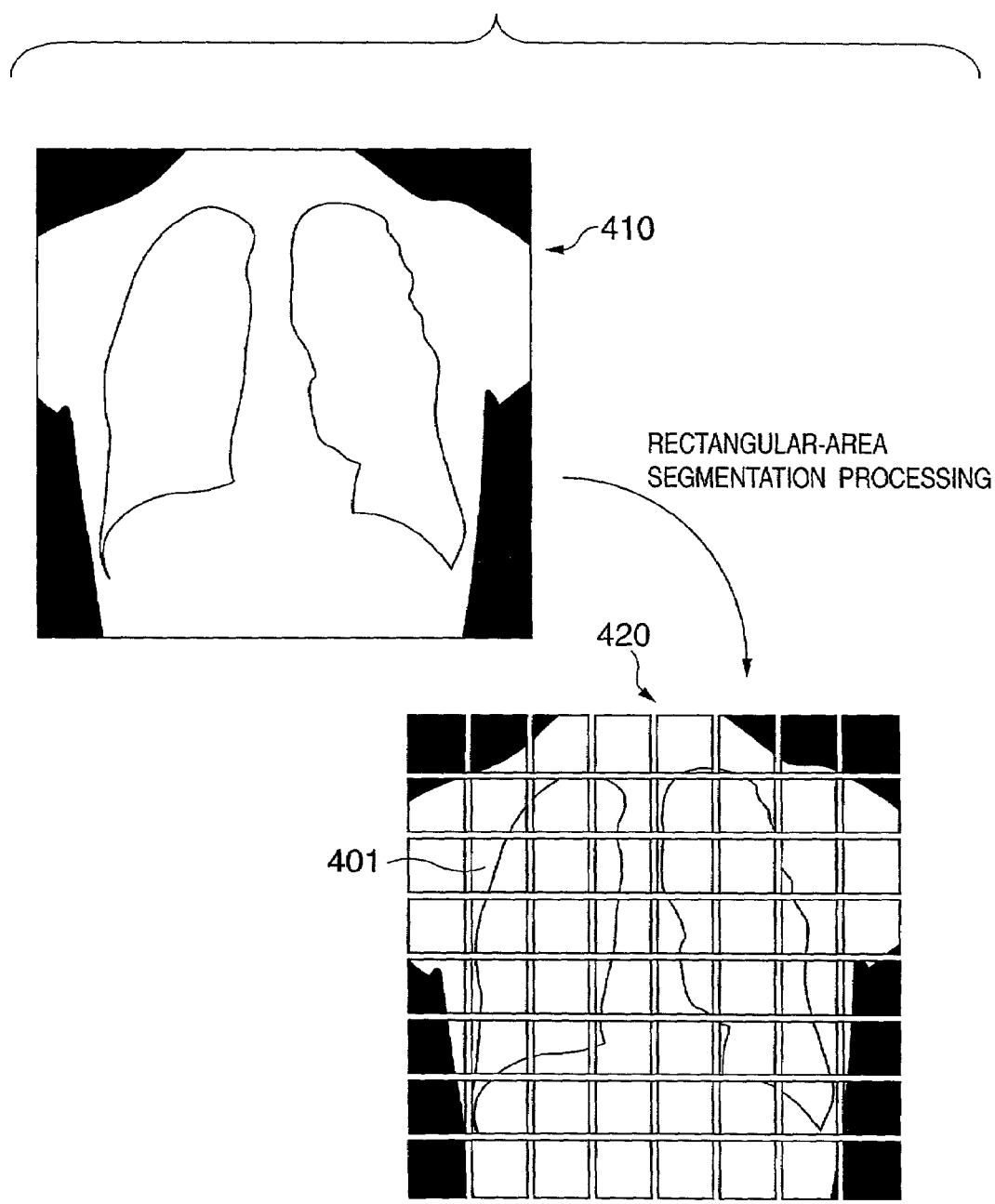
FIG. 4 is a diagram illustrating the manner in which processing for segmenting an image into rectangular areas is performed.

Next, noise elimination processing is executed by the image processing circuit 112 at a step S203. FIG. 3 is a flowchart illustrating the specifics of this processing and reference will be had to this flowchart to describe this processing. It is assumed that the a program in accordance with the flowchart shown in FIG. 3 has been stored in the main memory 109 or in a ROM (not shown), and is read out and executed by the CPU 108. FIG. 4 is a diagram illustrating the manner in which processing for segmenting an image into rectangular areas is performed. Reference will be had to this diagram as well.

The original image that has been preprocessed by the preprocessing circuit 106 is transferred to the image processing circuit 112 via the CPU bus 107. The area segmentation circuit 115 in the image processing circuit 112 segments the entirety of the original image into a plurality of rectangular areas (step S301) in the manner shown 420 in FIG. 4. The discrete wavelet transform circuit 116 subjects each rectangular area 401 thus obtained by segmentation to a discrete wavelet transform and outputs wavelet coefficients (step S302). At the same time, the texture analyzing circuit 113 subjects each rectangular area 401 thus obtained by segmentation to texture analysis and outputs the results of analysis (step S303). An example of a specific method of analyzing texture is to calculate a variance d of a pixel value within a rectangular area of interest.

Next, on the basis of the results of texture analysis at step S303, the coefficient conversion circuit 117 applies a coefficient conversion (step S304) to the wavelet transform coefficients of each of the areas 401 obtained at step S302. In this embodiment, high-frequency components (e.g., transform coefficients contained in HH of the highest level) among the transform coefficients are subjected to the coefficient conversion. Though there is no particular limitation upon specific algorithms for the coefficient conversion, in this embodiment the coefficient conversion is carried out by processing in accordance with the flowchart shown in FIG. 6.

It is determined at step S601 whether the above-mentioned variance d is greater than a threshold value θ (a predetermined value decided in dependence upon the variance d). If d>θ holds, control proceeds to step S602, at which the transform coefficients included in the high-frequency components are shifted down by n (n>1) bits (h>>n holds, where h represents a transform coefficient).

If d>θ holds, this indicates that the distribution of pixel values within a rectangular area of interest is constant and is greater than a fixed quantity (θ). In other words, in terms of the image, the rectangular area is rendered uniform by noise. Accordingly, by lowering the high-frequency components of pixel values within the rectangular area of interest, the effects of noise can be alleviated and the image within the rectangular area of interest can be made more distinct.

Next, at step S603, it is determined whether the bit shift has been applied to all transform coefficients included in the high-frequency components.

Processing for implementing the coefficient conversion at step S304 is not limited to that described above. For example, another method is to create a coefficient conversion LUT (look-up table) that conforms to the level of decomposition of the discrete wavelet transform and perform the coefficient conversion in accordance with the LUT.

Finally, using the wavelet coefficients of each area subjected to the conversion by the coefficient conversion circuit 117 at step S304, the discrete wavelet transform circuit 116 applies an inverse discrete wavelet transform to reconstruct the image data of each area 401 (step S305). The image processing circuit 112 then connects the areas 401 and outputs an image from which noise has been eliminated (step S306).

The discrete wavelet transform (step S302) and the inverse discrete wavelet transform (step S305) implemented by the discrete wavelet transform circuit 116 represent transform processing that is generally known. These operations will now be described.

The discrete wavelet transform circuit 116 subjects the entered image signal to two-dimensional discrete wavelet transform processing, calculates the transform coefficients and outputs the same. The image data that has been stored in the main memory 109 is read out successively and subjected to transform processing by the discrete wavelet transform circuit 116, and the transform coefficients obtained by this transform processing are written to the main memory 109 again.

When the transform coefficients are stored in the main memory 109, they are stored in a separate area and are not written over the area in which the original image data has been stored. In other words, the original image data is not altered in any way. The reason why is that this image data is referred to in the texture analysis processing executed at step S303. If this arrangement is adopted, the image data will be preserved and not lost even if the processing at step S303 is not executed at the same time as the processing at step S302, e.g., even in a case where the processing of step S303 is executed after the processing at step S302. It should be obvious, therefore, that the results obtained would be the same as those obtained when the processing of step S302 and the processing of step S303 is executed simultaneously.

Figure 5A:
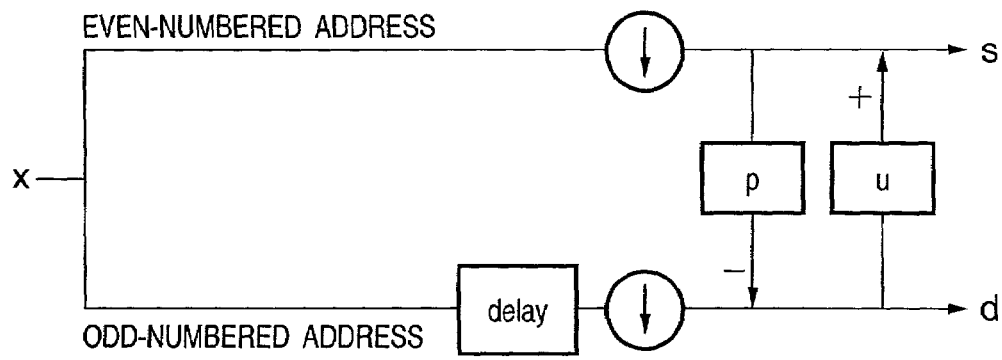
FIG. 5A is a diagram illustrating processing executed by a discrete wavelet transform circuit 116.

Processing executed by the discrete wavelet transform circuit 116 according to this embodiment is as shown in FIG. 5A. As shown in FIG. 5A, the entered image signal is separated into signals of even and odd addresses by a combination of a delay element and downsamplers, and filter processing is applied by two filters p and u. Characters s and d represent low-pass and high-pass coefficients, respectively, when each one-dimensional image signal has been subjected to one level of decomposition. Assume that these coefficients are calculated in accordance with the following equations:

$$d(n)=x(2n+1)-\text{floor}[\{x(2n)+x(2n+2)\}/2] \quad (1)$$

$$s(n)=x(2n)+\text{floor}[\{d(n-1)+d(n)\}/4] \quad (2)$$

where x(n) represents an image signal that is to be transformed.

By virtue of the processing set forth above, onedimensional discrete wavelet transform processing is applied to the image signal. A two-dimensional discrete wavelet transform implements a one-dimensional discrete wavelet transformation successively in horizontal and vertical directions of an image. As the details of this processing are well known, the processing will not be described here.

Figure 5B:
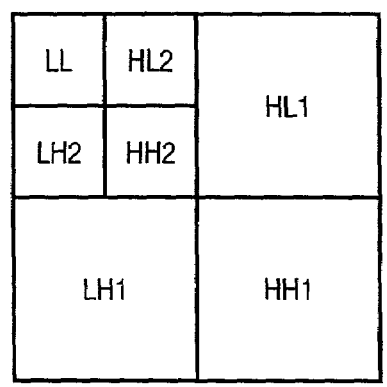
FIG. 5B is a diagram showing an example of groups of two-level transform coefficients obtained by a two-dimensional discrete wavelet transform processing.

FIG. 5B is a diagram illustrating an example of a group of transform coefficients of two levels obtained by two-dimensional discrete wavelet transform processing. The image signal is decomposed into coefficient sequences HH1, HL1, LH1, LH2, HH2, HL2, LL of different frequency bands. An inverse discrete wavelet transform is performed in a similar manner as follows: The transform coefficients that have been stored in the main memory 109 are read out successively and subjected to transform processing by the discrete wavelet transform circuit 116, and image data that is based upon the transform coefficients is written to the main memory 109 again.

Figure 5C:
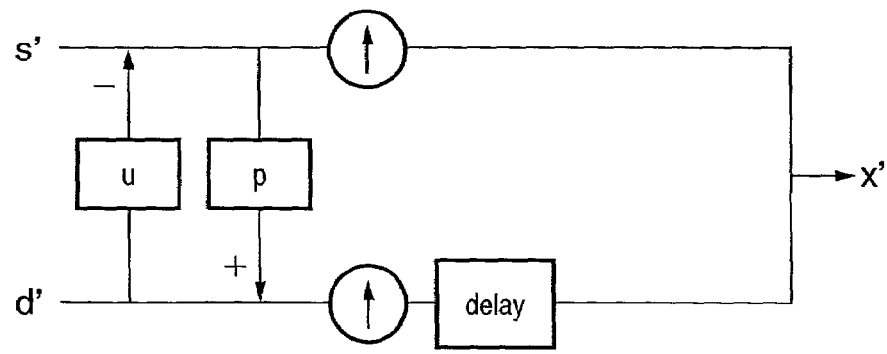
FIG. 5C is a diagram showing inverse discrete wavelet transform processing by the discrete wavelet transform circuit 116.

Inverse discrete wavelet transform processing executed by the discrete wavelet transform circuit 116 according to this embodiment is as shown in FIG. 5C. Here the entered transform coefficients are subjected to the processing of the two filters u and p. After upsampling is performed, the coefficients are superimposed and an image signal x' is output. These processes are executed in accordance with the following equations:

$$x'(2n)=s'(n)-\text{floor}[\{d'(n-1)+d'(n)\}/4] \quad (3)$$

$$x'(2n+1)=d'(n)+\text{floor}[\{x'(2n)+x'(2n+2)\}/2] \quad (4)$$

By virtue of the processing set forth above, one-dimensional inverse discrete wavelet transform processing is applied to the transform coefficients. A two-dimensional inverse discrete wavelet transform implements a one-dimensional inverse discrete wavelet transform successively in horizontal and vertical directions of an image. As the details of this processing is well known, the processing will not be described here.

Features necessary for a gray-level transformation are extracted by the feature extraction circuit 118 at step S204, and gray-level transformation is performed at step S205 in conformity with the features obtained at step S204, as described above. Since there is no particular limitation upon the processing of steps S204 and S205 in this embodiment, a detailed description of this processing will not be presented here.

In accordance with the image processing apparatus and image processing method of this embodiment as described above, multiplexed frequency processing based upon a discrete wavelet transform is carried out. The effect obtained as a result is that noise elimination can be achieved even in a case where noise components are distributed over a wide frequency band, as compared with so-called filter processing that deals with a single frequency band. In addition, cost of computation necessary for processing can be reduced in comparison with processing that makes simultaneous use of a plurality of filters of different sizes (i.e., different frequencies). The effect obtained is that processing having high general versatility can be executed without the complicated task of adjusting filter size. Further, an image is segmented into a plurality of rectangular areas and noise elimination processing is executed using separate parameters that are based upon the results of texture analysis. In comparison with processing in which the image is processed uniformly, therefore, it is possible to implement processing that conforms to each individual area. This makes it possible to obtain an image from which noise has been eliminated at a performance higher than that achieved with the conventional methods.

[Second Embodiment]

In the first embodiment, the result of texture analysis by the texture analyzing circuit 113 is used only in coefficient conversion processing in the coefficient conversion circuit 117. According to the second embodiment, the result of texture analysis is used in selection of a filter employed in a discrete wavelet transform. That is, when texture analysis is applied to an image within a rectangular area, the result of this texture analysis is used to select a discrete wavelet transform filter for application to this rectangular area.

A difference between filters used manifests itself as a difference in the frequency-band decomposition characteristics. For example, the feature of a 9/7-type filter (the details of which are well known and therefore need not be described) is that this filter finely separates high-frequency components. By way of example, a Harr filter (the details of which are well known and need not be described) is characterized in that the separation width of a frequency band is large and in that this filter makes it possible to execute decomposition processing to frequencies lower than that of a 9/7 filter in decomposition processing at the same dimension. A plurality of discrete wavelet transform filters characterized by such a frequency-band decomposition characteristics are provided in advance and the filters are used selectively in dependence upon the results of texture analysis. A plurality of filters inclusive of these filters may be stored in a memory (not shown) within the discrete wavelet transform circuit 116 or in the main memory 109.

One specific method of texture analysis according to this embodiment that can be mentioned is to find a variance d of a pixel value within a rectangular area of interest. The above-mentioned filter selection can be implemented as follows using the threshold value θ:

if (d>θ) then "use 9/7 filter"
    else then "use Harr filter"

The foregoing is a very simple example in which only the variance of a pixel value is utilized as a texture feature. However, other texture features may be used and a plurality of texture features may be utilized in combination as a matter of course.

A flowchart of the above-described image processing method according to this embodiment is the same as that shown in FIG. 2. With regard to the specific processing of step S203, the flowchart will be such that the processing steps S302, S303 in FIG. 3 are executed serially, step S303 is executed before step S302 and the processing of step S304 is not executed.

[Third Embodiment]

Figure 7:
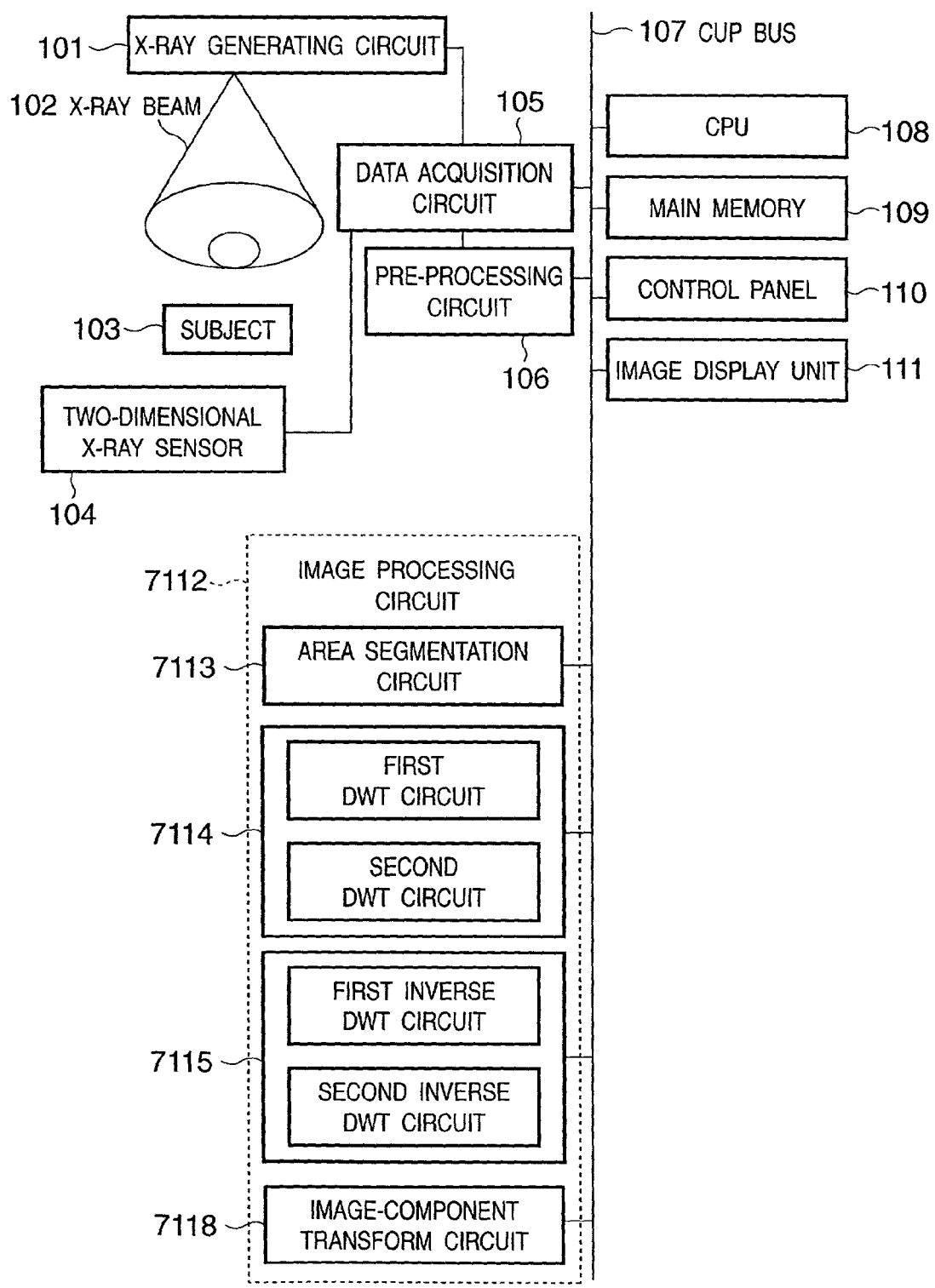
FIG. 7 is diagram showing the structure of an X-ray photography apparatus according to a third embodiment of the present invention.

FIG. 7 is a block diagram illustrating the structure of an X-ray photography apparatus 7100 serving as an image processing apparatus according to a third embodiment of the present invention, in which components identical with those shown in FIG. 1 are designated by like reference characters. The image processing apparatus of this embodiment differs from that of the first embodiment in an image processing circuit 7112, which will now be described.

The image processing circuit 7112 includes an area segmentation circuit 7113 for segmenting an image into small areas (referred to as tiles below) and deciding a wavelet transform scheme, which is performed by a discrete wavelet transform (DWT) circuit 7114 (described later), on a tile-by-tile basis. The discrete wavelet transform circuit 7114, which is capable of implementing a plurality of wavelet transform schemes, subjects the original image to a discrete wavelet transform and obtains image components (wavelet transform coefficients) of each frequency band.

The image processing circuit 7112 further includes an image-component transform circuit 7118 for transforming image components of each frequency band obtained by the DWT circuit 7114, and an inverse DWT circuit 7115 for inversely transforming the image components transformed by the image-component transform circuit 7118 and synthesizing an image by a plurality of inverse DWT schemes.

Figure 8:
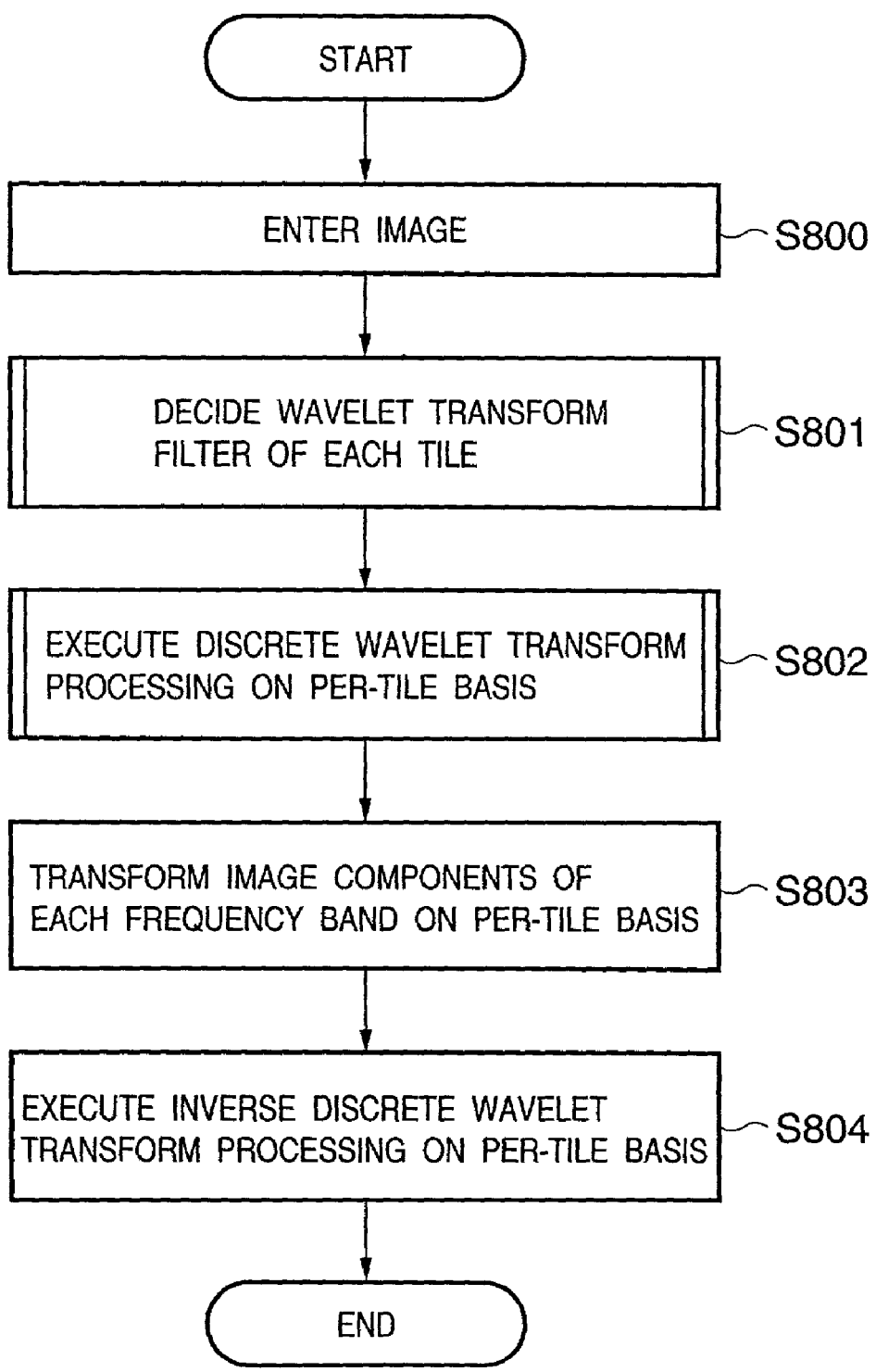
FIG. 8 is a flowchart of processing executed by the X-ray photography apparatus according to the third embodiment.
Figure 9:
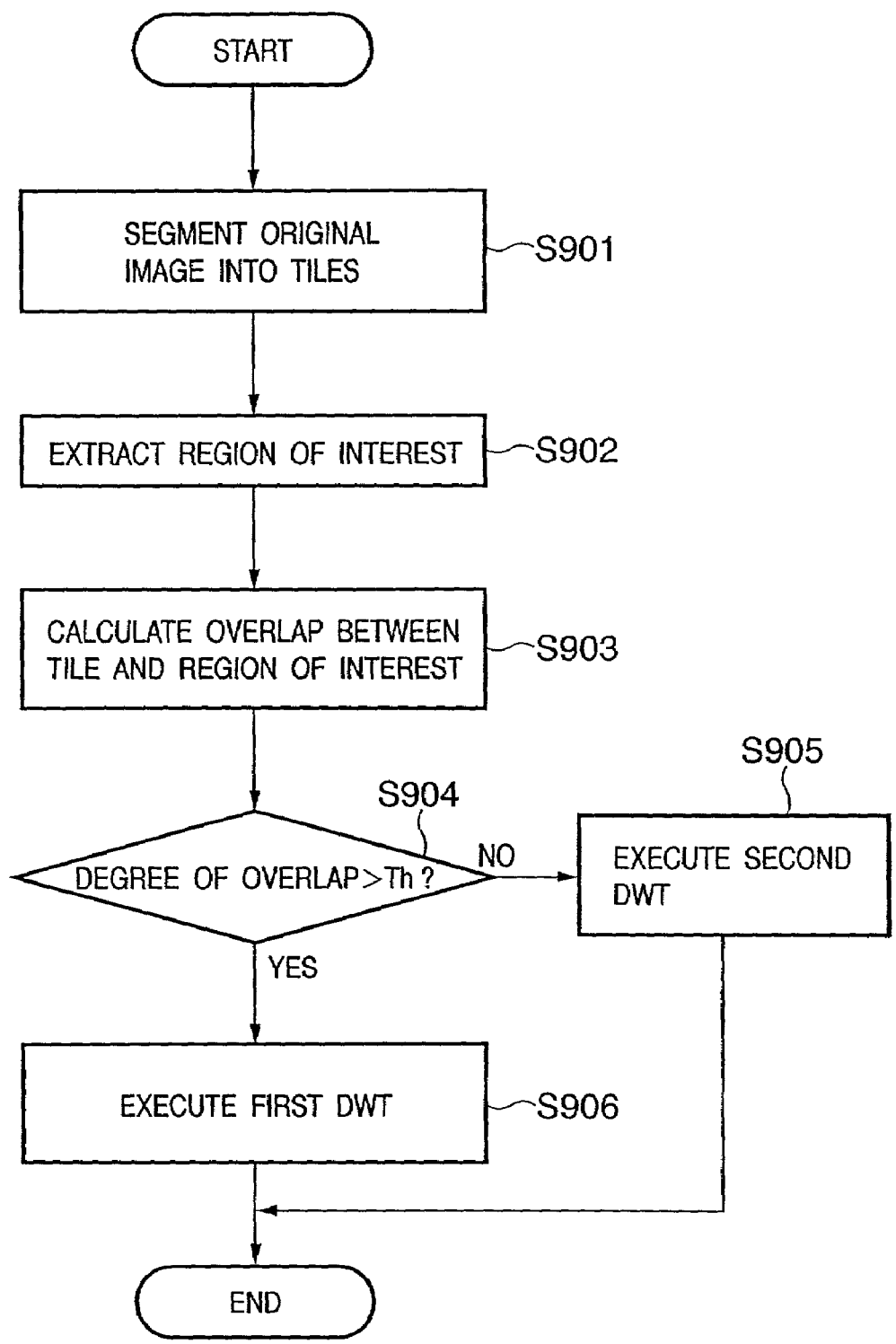
FIG. 9 is a flowchart illustrating processing for area segmentation according to the third embodiment.
Figure 10:
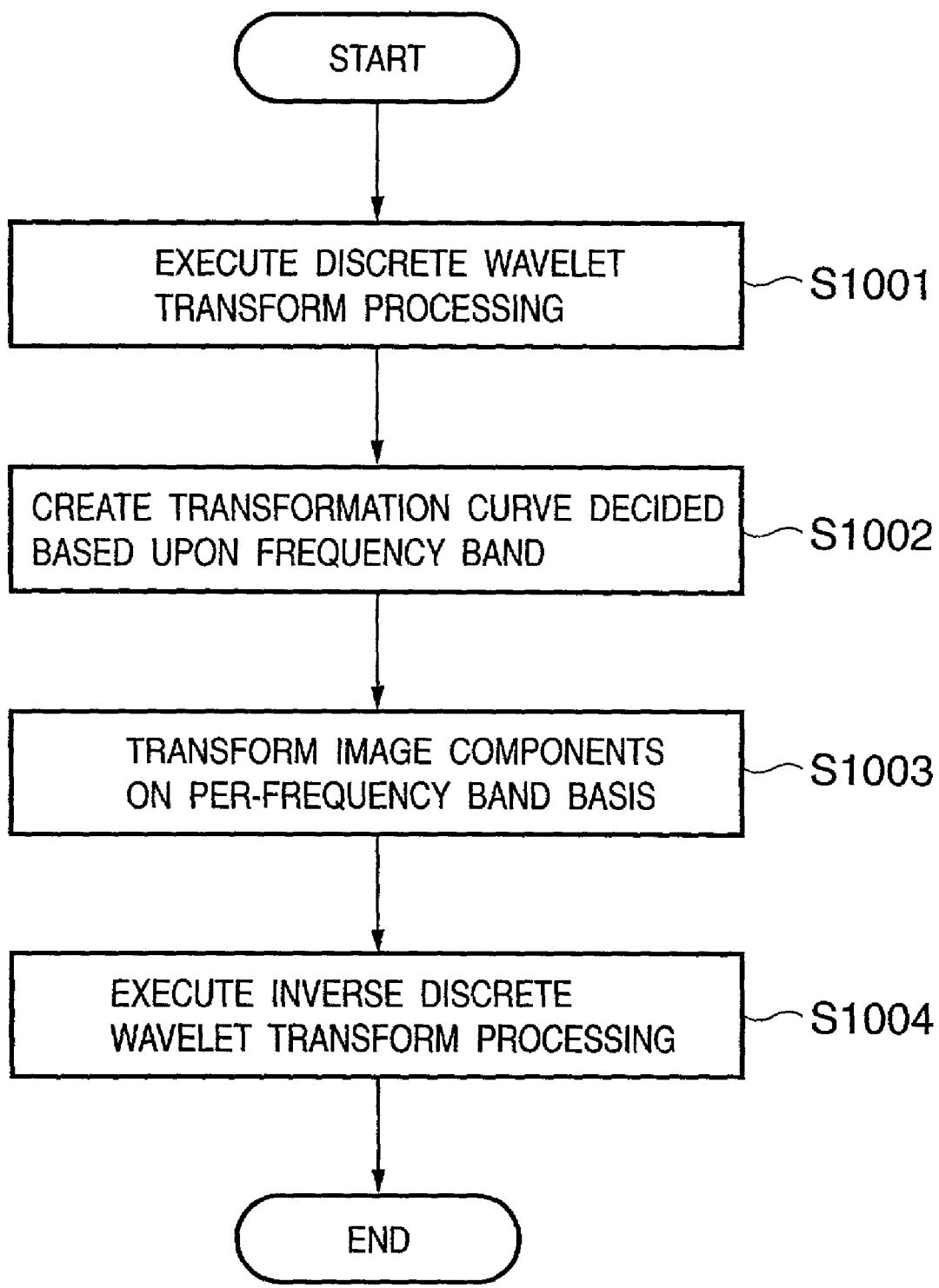
FIG. 10 is a flowchart illustrating processing for area segmentation according to the third embodiment.

The processing executed by the X-ray photography apparatus 7100 according to the embodiment constructed as set forth above will now be described using the processing flowcharts shown in FIGS. 8, 9 and 10. It is assumed that programs in accordance with the flowcharts shown in FIGS. 8, 9 and 10 have been stored in the main memory 109 or in a ROM (not shown), and are read out and executed by the CPU 108.

Figure 11A:
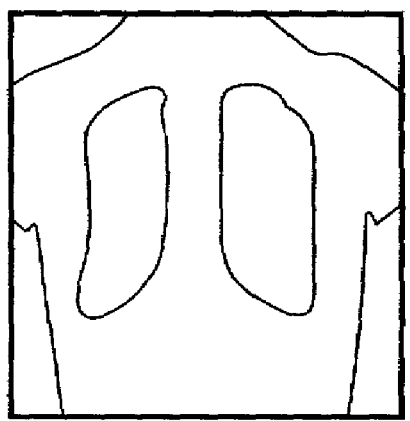
FIG. 11A is a diagram useful in describing area segmentation.

The original image that has been preprocessed by the preprocessing circuit 106 is transferred to the image processing circuit 7112 via the CPU bus 107 (step S800). It is assumed here that the original image is an image of a front view of a chest shown by way of example in FIG. 11A. In the image processing circuit 7112, first the area segmentation circuit 7113 segments the original image into tiles and decides a wavelet transform scheme (filter) for each tile obtained by segmentation (step S801). The details of this processing will be described in accordance with the flowchart shown in FIG. 9.

Figure 11B:
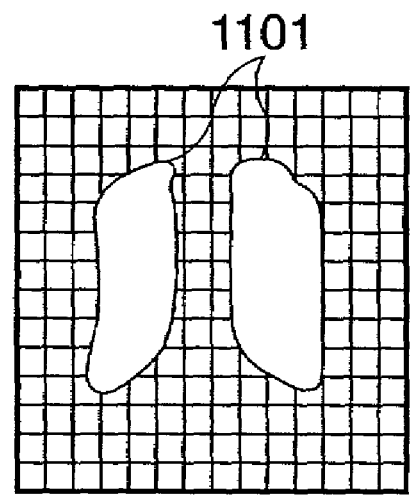
FIG. 11B is a diagram useful in describing area segmentation.

First, the area segmentation circuit 7113 segments the original image into square tiles of a predetermined size, as shown in FIG. 11B (step S901). Next, the area segmentation circuit 7113 extracts, as a region 1101 of interest, an area such as a lung having anatomical features (step S902). A well-known method is used to extract the region 1101 of interest but the method is not specifically defined here.

Next, the area segmentation circuit 7113 computes, tile by tile, the ratio of overlap between the region 1101 of interest and each tile (step S903). The proportion of the area of the region of interest contained in a tile is computed as the degree of overlap. More specifically, the ratio of the number of pixels constituting the region of interest to the number of pixels in a tile is computed. If the value of the degree of overlap is greater than a fixed threshold value Th ("YES" at step S904), then the tile is subjected to frequency decomposition using a first DWT circuit (step S906) (this processing shall be referred to as a "first DWT"). If the value of the degree of overlap is equal to or less than the fixed threshold value Th ("NO" at step S904), then the tile is subjected to frequency decomposition using a second DWT circuit (step S905) (this processing shall be referred to as a "second DWT").

The difference between the characteristics of these DWT circuits is the difference between the types of filters used. Each DWT circuit is characterized by the frequency-band decomposition characteristics. For example, in the first DWT circuit, use is made of a filter (e.g., a 9/7 filter that is well known and need not be described) characterized in that it finely separates high-frequency components. In the second DWT circuit, use is made of a filter (e.g., a Harr filter that is well known and need not be described) for which the frequency-band separation width is large and that makes it possible to execute decomposition processing to frequencies lower than that of the first DWT circuit in decomposition processing in the same dimension. A plurality of DWT circuits characterized by such a frequency-band decomposition characteristics are provided in advance and the filters are used selectively in dependence upon the region and part of the body.

In accordance with the tile and wavelet transform scheme decided by the area segmentation circuit 7113, the DWT circuit 7114 executes frequency decomposition processing on a per-tile basis (step S802).

The details of processing at step S802 will now be described in accordance with the flowchart of FIG. 10. The DWT circuit 7114 selects a DWT circuit decided by the area segmentation circuit 7113 tile by tile, subjects the image signal within the tile to two-dimensional DWT processing, calculates image components (transform coefficients) and outputs the same. When the transform coefficients of each tile have been found, a flag (a DWT circuit selection flag) indicating which DWT circuit was used is appended to each tile.

The structure of the DWT circuit 7114 used in this embodiment is as illustrated in FIG. 5A and is as described in the first embodiment. The description need not be repeated here. The DWT circuit 7114 decomposes the image signal into image components HH1, HL1, LH1, . . . , LL (step S1001). In FIG. 5B, HH1, HL1, LH1, . . . , LL, etc. (referred to as subbands below) indicate the image components of each frequency band.

Figure 12:
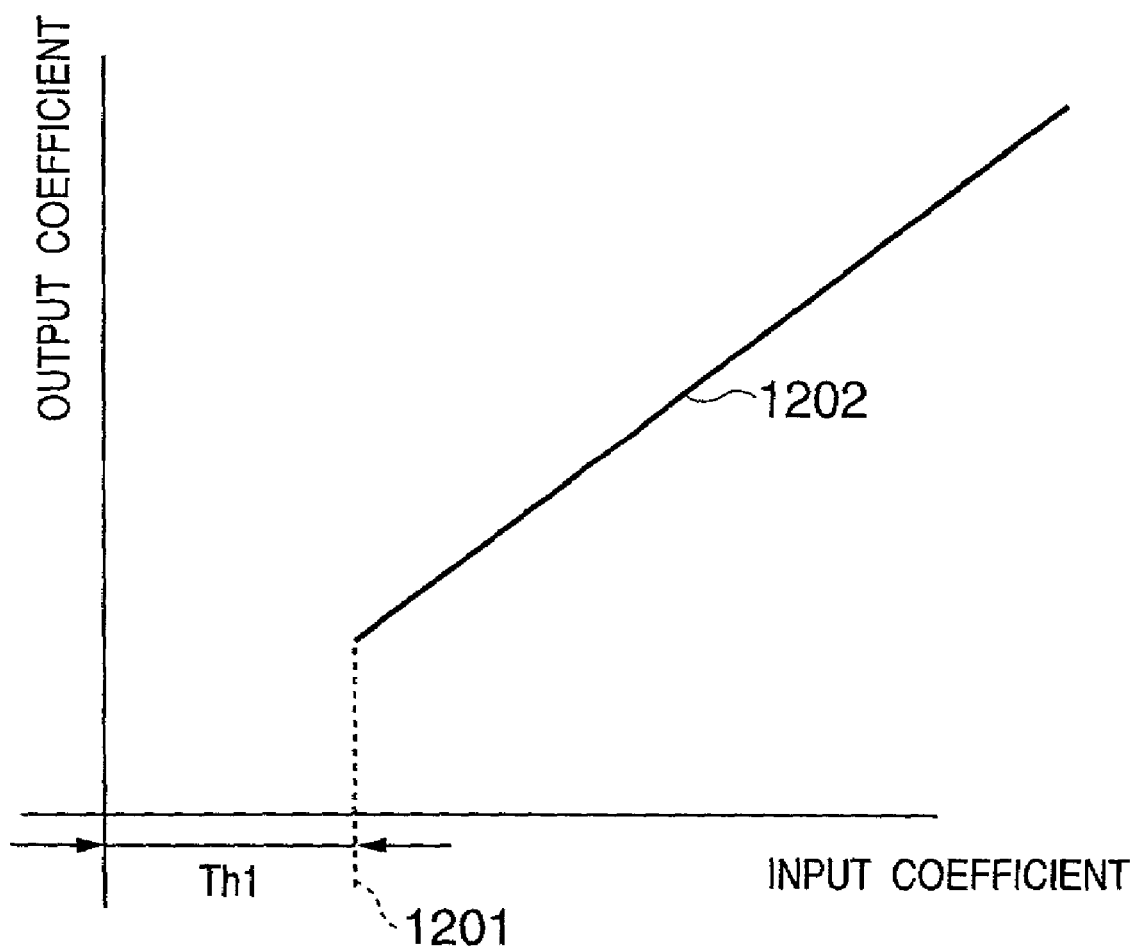
FIG. 12 is a diagram illustrating a transformation curve and a threshold value.

Next, the image-component transform circuit 7118 creates a transformation curve, shown by way of example in FIG. 12, for each frequency band (step S1002) and transforms the image components (step S1003). More specifically, the image-component transform circuit 7118 performs scaling in accordance with a curve 1202 with respect to a transform coefficient (input coefficient in FIG. 12) the value of which is greater than a threshold value Th1 (1201).

FIG. 12 shows an example of a transformation curve created by the image-component transform circuit 7118. Input coefficients (input image components) are plotted along the horizontal axis and output coefficients (output image components) along the vertical axis.

In the transformation curves 1202 shown in FIG. 12, that created at step S1002 for every tile and every subband are used as the slope of the transformation curve 1202 and the threshold value 1201. Even if the same DWT circuit is employed, for example, use is made of a transformation curve for every frequency that differs from tile to tile. An example of such a transformation curve is one which changes in dependence upon the anatomical region and the pixel values of the original image. As a result, frequency processing can be executed finely on a per-tile basis.

By referring to the above-mentioned DWT circuit selection flag appended to a tile, the inverse DWT circuit 7115 specifies the filter used at the time of two-dimensional DWT processing, specifies a filter to be used in inverse DWT that conforms to the above-mentioned specified filter, and then implements the inverse DWT tile by tile (step S1004). The structure of the inverse DWT circuit 7115 is as shown in FIG. 5C. The type of filter differs for each DWT circuit. For example, the first inverse DWT circuit uses a filter that corresponds to a 9/7 filter, and the second DWT circuit uses a filter that corresponds to a Harr filter.

In cases where an image is stored, the image data prior to the inverse transform is stored. In such case image data prior to the transform processing of each image component may be stored or image data obtained after component transform processing may be stored. In a case where an image prior to component transformation is stored, component transform processing is executed before the inverse transform processing. This makes it possible to reconstruct the original image in a case where an image prior to component transformation is stored. However, it is necessary to execute component transform processing in reconstruction.

In a case where image data is stored after the component transformation, on the other hand, the original image cannot be reconstructed but compression efficiency can be raised by eliminating high-frequency components. Further, image conversion processing need not be executed during reconstruction processing. Furthermore, by using a filter exhibiting good high-frequency separability for a region (e.g., the lungs) that includes many high-frequency components, the degree of correlation between the image data and filter is improved, the number of items of data for expressing the image diminishes and, as a result, the compression rate increases. Similarly, by using a filter exhibiting good low-frequency separability for a region (e.g., the stomach) that includes many low-frequency components, the degree of correlation between the image data and filter is improved, the number of items of data for expressing the image diminishes and, as a result, the compression rate increases. Accordingly, by using a filter that differs for each region, rather than applying a uniform filter as a whole, the overall compression rate of the data rises. In particular, in the case of the human body, when anatomic region such as the chest and the stomach, and the like are difference, frequency components thereof also differ. By using a filter that differs from one anatomical region to another, efficiency such as data compression rate is improved.

In the lung area, images of blood vessels and fine trabecular are made up of high-frequency components. In order to enhance the images of these portions, it becomes necessary to transform the high-frequency components. With this embodiment, the target high-frequency components can be enhanced precisely using a DWT circuit that is capable of finely separating high-frequency components associated with the lungs.

Images of internal organs such as the stomach, on the other hand, are made up of low- to- mid-range frequencies. In order to enhance the images of these organs, it is required to perform enhancement over a wide range of low- to- mid-range frequencies. With this embodiment, the type of filter used for the stomach is one which has a wide band of separation frequencies and which is capable of performing separation down to low frequencies with a number of separations of low order. This makes it possible to enhance low- to- mid-range frequency components accurately. By thus using a DWT circuit selectively in accordance with the characteristics of each region, processing for enhancing a region of interest can be executed accurately in an efficiency manner.

Thus, in the embodiment described above, decomposition of a target frequency can be performed efficiently using DWT circuits having decomposition characteristics that differ for each area. Further, a target frequency component can be enhanced finely by performing frequency decomposition area by area in a target frequency bandwidth. Furthermore, by using a DWT circuit selectively for each anatomical region, frequency processing can be executes finely for every anatomical region and frequency processing of the overall image can be executed precisely. In addition, the method and strength of frequency enhancement can be changes tile by tile, as a result of which it is possible to execute frequency processing finely over the detailed portions of an image. It is also possible to execute optimum frequency processing for the image overall.

[Fourth Embodiment]

The X-ray photography apparatus serving as the image processing apparatus of this embodiment is obtained by providing the X-ray photography apparatus of the third embodiment with one additional discrete wavelet transform circuit and one additional inverse discrete wavelet transform circuit. As in the third embodiment, this apparatus has a function for selecting a discrete wavelet transform schedule in dependence upon the proportion of a region of interest contained in each tile, and applying a two-dimensional discrete wavelet transform to each tile, in a manner similar to that of the third embodiment, in accordance with the selected transform schedule. Further, after the discrete wavelet transform has been applied, a component transform is applied and a transform that is the inverse of the discrete wavelet transform applied to each tile is implemented in a manner similar to that of the third embodiment.

Figure 13:
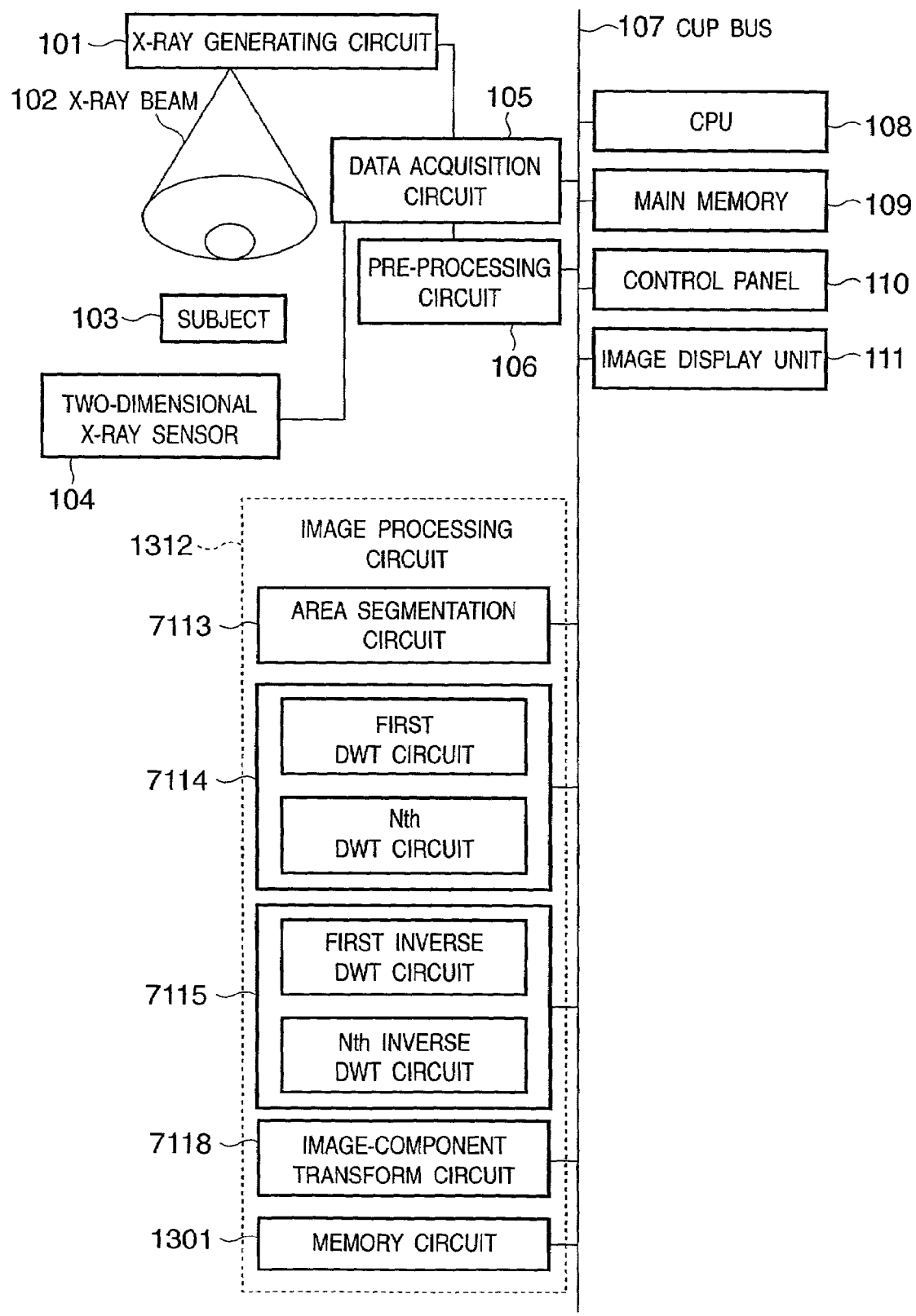
FIG. 13 is diagram showing the structure of an X-ray photography apparatus according to a fourth embodiment of the present invention.

The X-ray photography apparatus according to this embodiment will now be described. FIG. 13 illustrates the structure of the X-ray photography apparatus according to this embodiment, in which components identical with those shown of the apparatus shown in FIG. 7 are designated by like reference characters. This apparatus differs from that shown in FIG. 7 in that it is provided with one additional DWT circuit and one additional inverse DWT circuit and with a memory circuit 1301.

Figure 14:
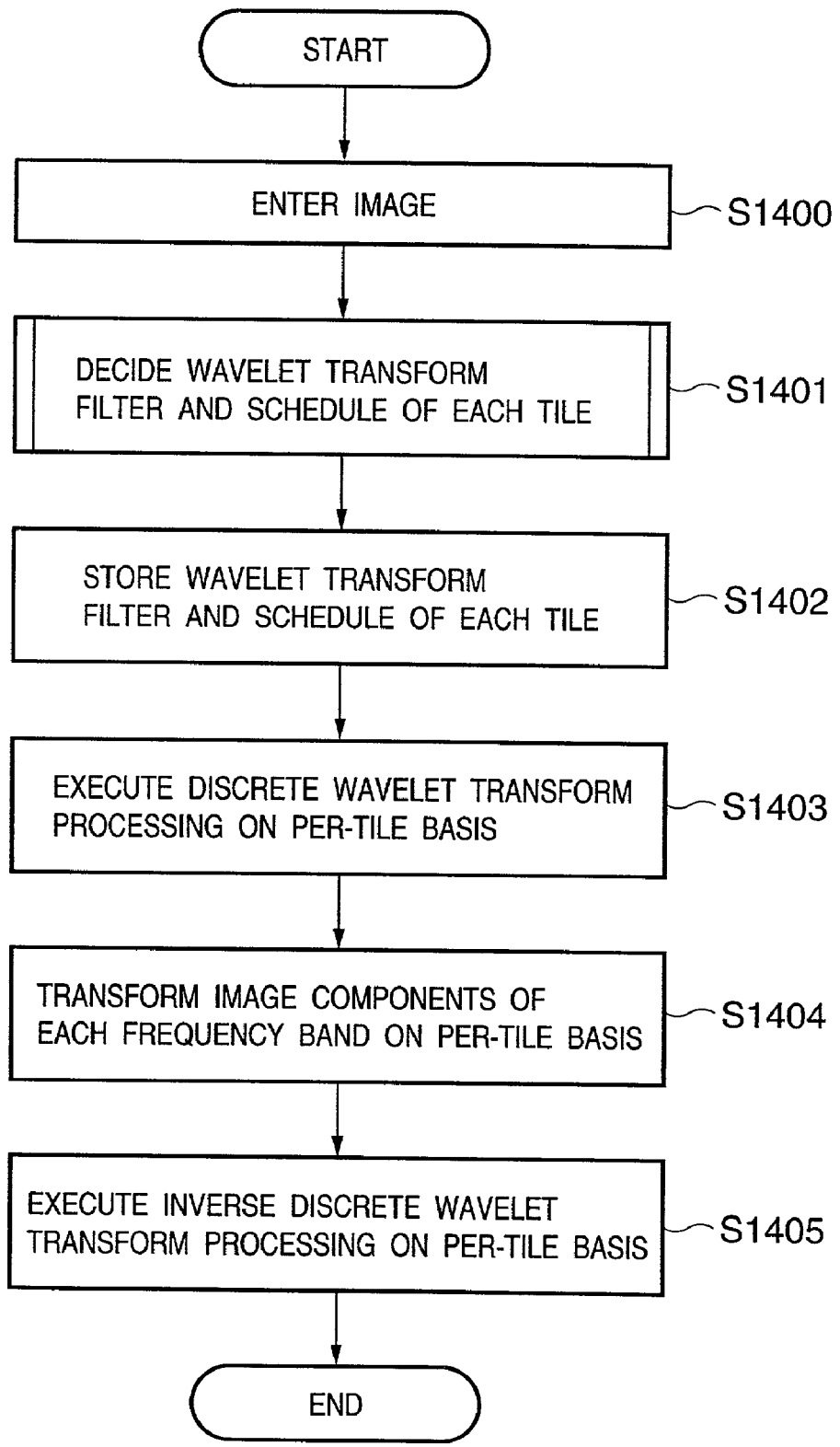
FIG. 14 is a flowchart of processing executed by the X-ray photography apparatus according to the fourth embodiment.
Figure 15:
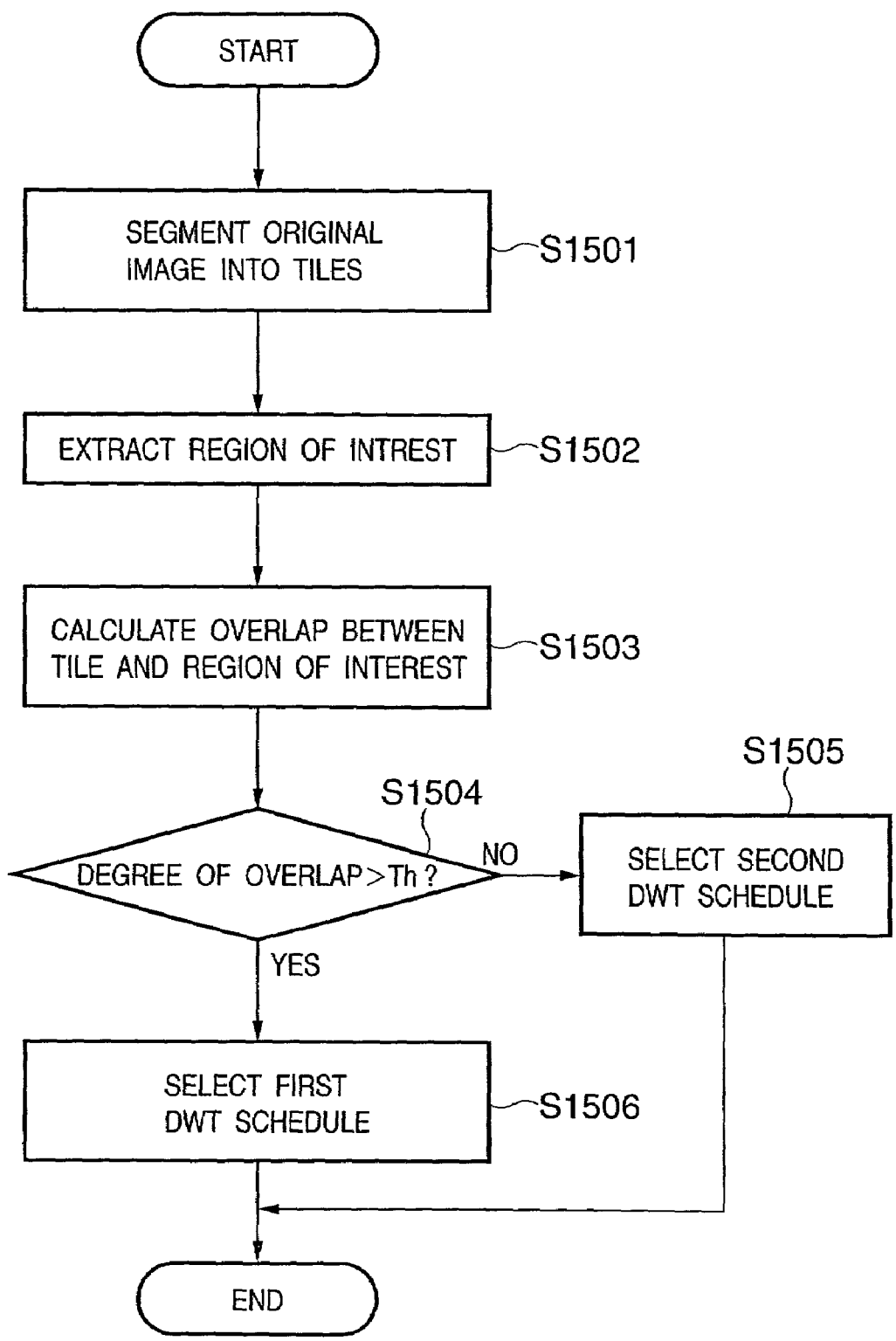
FIG. 15 is a flowchart useful in describing the details of processing at a step S1401 in processing executed by the X-ray photography apparatus according to the fourth embodiment.

The processing executed by this apparatus will be described below with reference to the processing flowcharts shown in FIGS. 14 and 15.

The original image that has been preprocessed by the preprocessing circuit 106 is transferred to an image processing circuit 1312 via the CPU bus 107 (step S1400). It is assumed here that the original image is an image of a front view of a chest shown by way of example in FIG. 11A. In the image processing circuit 1312, first the area segmentation circuit 7113 segments the original image into tiles and decides a wavelet transform schedule for each tile obtained by segmentation (step S1401). The details of this processing will be described in accordance with the flowchart shown in FIG. 15.

First, the area segmentation circuit 7113 segments the original image into tiles of a predetermined size, as shown in FIG. 11B (step S1501). Next, the area segmentation circuit 7113 extracts, as a region 1101 of interest, an area such as a lung having anatomical features (step S1502). A well-known method is used to extract the region 1101 of interest but the method is not specifically defined here.

Next, the area segmentation circuit 7113 computes, tile by tile, the ratio of overlap between the region 1101 of interest and each tile (step S1503). The proportion of the area of the region of interest contained in a tile is computed as the degree of overlap. More specifically, the ratio of the number of pixels constituting the region of interest to the number of pixels in a tile is computed. If the value of the degree of overlap is greater than a fixed threshold value Th ("YES" at step S1504), then the tile is subjected to frequency decomposition upon selecting a first DWT schedule (step S1506). If the value of the degree of overlap is equal to or less than the fixed threshold value Th ("NO" at step S1504), then the tile is subjected to frequency decomposition using a second DWT schedule (step S1505).

An example of the first DWT schedule is to use a first DWT circuit (of 9/7 type) in case of first and second decomposition levels of the DWT, a second DWT circuit (of 5/3 type) in case of third and fourth decomposition levels, and a third DWT circuit (of Harr type) in case of fifth and sixth decomposition levels. The third DWT circuit, which is a DWT circuit with which the X-ray photography apparatus of the third embodiment is provided anew, is a filter for which the frequency-band separation width is large and that makes it possible to execute decomposition processing to frequencies lower than that of the second DWT circuit in decomposition processing in the same dimension. In this embodiment, a Harr-type filter is used as the third DWT circuit though the invention is not limited to this filter.

An example of the second DWT schedule, on the other hand, is to use the second DWT circuit (of 5/3 type) in case of first and second decomposition levels of the DWT, and the third DWT circuit (of Harr type) in case of third and fourth decomposition levels. It is assumed that the content of the first and second DWT schedules has been stored in the main memory 109.

The decomposition level is the number of times DWT processing is executed. For example, the second execution of DWT processing is referred to as the second decomposition level.

As a result, the first DWT schedule is selected for the chest area and the second DWT schedule is selected for the stomach area. Fine blood vessels, fine organs, medium blood vessels, medium organs and ribs are present in the chest area. Images of fine blood vessels and fine organs in the chest area have high frequencies as their principal components, images of medium blood vessels and medium organs have mid-range to high frequencies as their principal components, and images of ribs have mid-range to low frequencies as their frequency components. Accordingly, using a filter suited to each frequency band in order to adjust the sharpness of the overall chest image is efficient. For example, in order to enhance high frequencies, it will suffice to use a filter such as a 9/7 filter that exhibits an excellent separation characteristic with regard to high-frequency components. In order to enhance image components that span high- to low-frequency bands, use should be made of a 5/3 filter whose frequency band is broader than that of the 9/7 filter and that exhibits an excellent separation characteristic with regard to high- to mid-range frequencies. In order to enhance an image that is mainly mid-range to low-frequencies, as in the case of a rib, using a Harr-type filter having a broader frequency band and an excellent separation characteristic with regard to low frequencies is efficient.

The reason for the above is as follows: In order to decompose frequency down to low frequencies with a single 9/7 filter, a high-order decomposition level would be required and efficiency would decline. Further, in order to enhance image components of a low-frequency band with a 9/7 filter, the frequency band of which is narrow, it would be required to adjust image components across a plurality of decomposition levels and efficiency would decline.

The stomach area, on the other hand, is constituted by mid- to low-frequency components and therefore it would be more efficient to perform decomposition using the 5/3 filter and then the Harr filter in the order mentioned. This is because applying the 9/7 filter to an area that does not contain high-frequency components is not advisable for the reasons set forth above. Furthermore, with the second DWT schedule, the decomposition level is held to a small number because a filter having a broad frequency band is used. In addition, the image compression rate is raised by using a filter suited to each decomposition level.

The DWT schedule of each tile decided by the area segmentation circuit 7113 and the filter used for this schedule are stored in the memory circuit 1301 (step S1402). In accordance with the DWT schedule and filter stored in the memory circuit 1301, the DWT circuit 7114 executes frequency decomposition processing on a per-tile basis (step S1403). At this time the content of the DWT schedule also is read out of the main memory 109. The frequency decomposition processing uses two-dimensional DWT processing identical with that of the third embodiment. Taking the first DWT schedule as an example when frequency decomposition processing is executed in this embodiment, the 9/7 filter is used in frequency decomposition processing at the first decomposition level, whereby decomposition to the four subbands HH1, HL1, LH1, LL1 is achieved. Further frequency decomposition processing is executed using the 9/7 filter with respect to LL1 at the second decomposition level, whereby decomposition to the four subbands HH2, HL2, LH2, LL2 is achieved. Further frequency decomposition processing is executed using the 5/3 filter with respect to LL2 at the third decomposition level, whereby decomposition to the four subbands HH3, HL3, LH3, LL3 is achieved. Similar processing is repeated thenceforth.

Image components are transformed on a per-tile basis (step S1404). This processing is the same as that at step S1003 in the third embodiment.

The inverse DWT circuit 7115 reads in the filter used in the DWT schedule of each tile stored in the memory circuit 1301 at step S1402, specifies the filter used at the time of two-dimensional DWT processing, specifies a filter to be used in inverse DWT that conforms to the above-mentioned specified filter, and then executes the inverse DWT on a per-tile basis (step S1405). The method of inverse DWT is the same as that described in the third embodiment.

[Other Embodiments]

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a storage medium (or recording medium) storing the program codes of the software for performing the functions of the foregoing embodiments to a system or an apparatus, reading the program codes from the storage medium with a computer (e.g., a CPU or MPU) of the system or apparatus, and then executing the program codes. In this case, the program codes themselves read from the storage medium implement the novel functions of the embodiments and the storage medium storing the program codes constitutes the invention. Furthermore, besides the case where the aforesaid functions according to the embodiments are implemented by executing the program codes read by a computer, it goes without saying that the present invention also covers a case where an operating system or the like running on the computer performs a part of or the entire process in accordance with the designation of program codes and implements the functions according to the embodiments.

It goes without saying that the present invention further covers a case where, after the program codes read from the storage medium are written in a function expansion card inserted into the computer or in a memory provided in a function expansion unit connected to the computer, a CPU or the like contained in the function expansion card or function expansion unit performs a part of or the entire process in accordance with the designation of program codes and implements the function of the above embodiment.

In accordance with the present invention, as described above, noise is eliminated by obtaining transform coefficients of a wavelet transform based upon information in image data on a per-tile basis, and obtaining image data based upon these transform coefficients.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   segmentation means for segmenting image data into rectangular areas;

image analyzing means for obtaining pixel information based upon image data within rectangular areas obtained by said segmentation means;

wavelet transform means for obtaining transform coefficients by applying a wavelet transform to image data within the rectangular areas obtained by said segmentation means;

correction means for applying a correction to transform coefficients on a per-rectangular-area basis in accordance with the pixel information obtained by said image analyzing means; and inverse wavelet transform means for applying an inverse wavelet transform to all transform coefficients inclusive of the transform coefficients corrected by said correction means, wherein said image analyzing means subjects image data within a rectangular area to texture analysis.

2. The apparatus according to claim 1, further comprising image sensing means for imaging a subject to thereby obtain image data representing the subject.

3. The apparatus according to claim 2, wherein said image sensing means images the subject by an X-ray beam, and the image data obtained is X-ray image data.

4. The apparatus according to claim 1, wherein said image analyzing means performs the texture analysis by calculating variance of a pixel value within a rectangular area and a threshold value conforming to said variance.

5. The apparatus according to claim 1, wherein said image analyzing means includes table creation means for creating a table that conforms to a decomposition level of a discrete wavelet transform, and said correction means alters to transform coefficients on a per-rectangular-area basis using said table.

6. The apparatus according to claim 5, wherein the table is a transform-coefficient look-up table.

7. The apparatus according to claim 1, wherein said correction means alters transform coefficients, which are contained in comparatively high-frequency components, among said transform coefficients.

8. An image processing method comprising:

a segmentation step of segmenting image data into rectangular areas;

an image analyzing step of obtaining pixel information based upon image data within rectangular areas obtained at said segmentation step;

a wavelet transform step of obtaining transform coefficients by applying a wavelet transform to image data within the rectangular areas obtained at said segmentation step;

a correction step of applying a correction to transform coefficients on a per-rectangular-area basis in accordance with the pixel information obtained at said image analyzing step; and an inverse wavelet transform step of applying an inverse wavelet transform to all transform coefficients inclusive of the transform coefficients corrected at said correction step, wherein said image analyzing step subjects image data within a rectangular area to texture analysis.

9. A program stored on a computer-readable medium for executing the image processing method set forth in claim 8.

10. An image processing apparatus for applying image processing to an image containing a region of interest, comprising:

segmentation means for segmenting an image into tiles of a presented size;

frequency transform means for applying a frequency transform, which conforms to a proportion of the region of interest contained in a tile of interest, to the tile of interest;

component transform means for applying a component transform to transform coefficients contained in the tile of interest that has been subjected to the frequency transform by said frequency transform means;

inverse frequency transform means for applying a transform, which is the inverse of the transform by said frequency transform means, to the tile of interest that has been subjected to the component transform by said component transform means;

calculation means for calculating proportion of the region of interest contained in the die of interest; and selection means for selecting, from a plurality of frequency transform units which perform frequency transforms that differ from one another, a frequency transform unit conforming to said calculation means;

said frequency transform means applying the frequency transform to the tile of interest using the frequency transform unit selected by said selection means.

11. The apparatus according to claim 10, further comprising image sensing means for sensing an image;

wherein an image that includes the region of interest is sensed by said image sensing means.

12. The apparatus according to claim 11, wherein said image sensing means senses the image of a subject by an X-ray beam.

13. The apparatus according to claim 10, wherein said selection means selects a frequency transform unit, which applies the frequency transform to the tile of interest, from a plurality of frequency transform units in dependence upon whether the proportion of the region of interest contained in the tile of interest is greater than a fixed threshold value.

14. The apparatus according to claim 13, wherein said selection means selects:

a first frequency transform unit, which is for finely separating high-frequency components of the tile of interest, in a case where the proportion of the region of interest contained in the tile of interest is greater than a fixed threshold value; and a second frequency transform unit in which the separation width of a frequency band is large and it is possible to execute decomposition processing to frequencies lower than that of said first frequency transform unit in decomposition processing in the same dimension, in a case where the proportion of the region of interest contained in the tile of interest is equal to or less than the fixed threshold value.

15. The apparatus according to claim 14, wherein said first frequency transform unit uses a 9/7 filter.

16. The apparatus according to claim 14, wherein said second frequency transform unit uses a Harr filter.

17. The apparatus according to claim 10, wherein said frequency transform means applies a two-dimensional discrete wavelet transform to the tiles.

18. The apparatus according to claim 10, wherein the region of interest is a region having anatomical features of a lung.

19. An image processing apparatus for applying image processing to an image containing a region of interest, comprising:

segmentation means for segmenting an image into tiles of a prescribed size;

frequency transform means for applying a frequency transform, which conforms to a proportion of the region of interest contained in a tile of interest, to the tile of interest;

component transform means for applying a component transform to transform coefficients contained in the tile of interest that has been subjected to the frequency transform by said frequency transform means; and inverse frequency transform means for applying a transform, which is the inverse of the transform by said frequency transform means, to the tile of interest that has been subjected to the component transform by said component transform means, wherein said component transform means has curve creation means for creating a transformation curve for every tile and every frequency band;

said component transform means applying the component transform to the transform coefficients, which are contained in the frequency band, using the curve.

20. The apparatus according to claim 19, wherein said curve creation means creates the curve in accordance with an anatomical region and pixel values of an original image.

21. An image processing apparatus for applying image processing to an image containing a region of interest, comprising:

segmentation means for segmenting an image into tiles of a prescribed size;

frequency transform means for applying a frequency transform to a tile of interest in accordance with a frequency transform schedule that conforms to a proportion of the region of interest contained in the tile of interest;

component transform means for applying a component transform to transform coefficients contained in the tile of interest that has been subjected to the frequency transform by said frequency transform means; and inverse frequency transform means for applying a transform, which is the inverse of the frequency transform performed by said frequency transform means, to the tile of interest that has been subjected to the component transform by said component transform means, wherein said frequency transform means includes:

calculation means for calculating a proportion of the region of interest contained in the tile of interest; and selection means for selecting, from frequency-transform schedules implemented using several frequency transform units from among a plurality of transform units which perform frequency transforms that differ from one another, a schedule conforming to said calculation means;

said frequency transform means applying the frequency transform to the tile of interest in accordance with the schedule selected by said selection means.

22. The apparatus according to claim 21, further comprising image sensing means for sensing an image; wherein an image that includes the region of interest is sensed by said image sensing means.

23. The apparatus according to claim 22, wherein said image sensing means senses the image of a subject by an X-ray beam.

24. The apparatus according to claim 21, wherein said selection means selects a schedule for applying a frequency transform to the tile of interest in dependence upon whether the proportion of the region of interest contained in the tile of interest is greater than a fixed threshold value.

25. The apparatus according to claim 21, wherein said selection means selects:

a first transform schedule in a case where the proportion of the region of interest contained in the tile of interest is greater than a fixed threshold value; and a second transform schedule in a case where the proportion of the region of interest contained in the tile of interest is equal to or less than the fixed threshold value.

26. The apparatus according to claim 25, wherein the first transform schedule is to use a frequency transform unit that employs a 9/7 filter at first and second decomposition levels of a frequency transform, use a frequency transform unit that employs a 5/3 filter at third and fourth decomposition levels, and use a frequency transform unit that employs a Harr filter at fifth and sixth decomposition levels.

27. The apparatus according to claim 26, wherein the decomposition level is number of times a frequency transform is performed.

28. The apparatus according to claim 25, wherein the second transform schedule is to use a frequency transform unit that employs a 5/3 filter at first and second decomposition levels of a frequency transform, and use a frequency transform unit that employs a Harr filter at third and fourth decomposition levels.

29. An image processing method for applying image processing to an image containing a region of interest, comprising:

a segmentation step of segmenting an image into tiles of a prescribed size;

a frequency transform step of applying a frequency transform, which conforms to a proportion of the region of interest contained in a tile of interest, to the tile of interest;

a component transform step of applying a component transform to transform coefficients contained in the tile of interest that has been subjected to the frequency transform at said frequency transform step; and an inverse frequency transform step of applying a transform, which is the inverse of the frequency transform performed at said frequency transform step, to the tile of interest that has been subjected to the component transform at the component transform step;

wherein said frequency transform step includes:

a calculation step of calculating proportion of the region of interest contained in the tile of interest; and a selection step of selecting, from a plurality of frequency transform units which perform frequency transforms that differ from one another, a frequency transform unit conforming to results obtained at said calculation step;

the frequency transform being applied to the tile of interest using the frequency transform unit selected at said selection step.

30. A program stored on a computer-readable medium for executing the image processing method set forth in claim 29.

31. An image processing method for applying image processing to an image containing a region of interest, comprising:

a segmentation step of segmenting an image into ties of a prescribed size;

a frequency transform step of applying a frequency transform to a tile of interest in accordance with a frequency transform schedule that conforms to a proportion of the region of interest contained in the tile of interest;

a component transform step of applying a component transform to transform coefficients contained in the tile of interest that has been subjected to the frequency transform at said frequency transform step; and an inverse frequency transform step of applying a transform, which is the inverse of the frequency transform performed at said frequency transform step, to the tile of interest that has been subjected to the component transform at said component transform step;

wherein said frequency transform step includes:

a calculation step of calculating proportion of the region of interest contained in the tile of interest; and a selection step of selecting, from frequency-transform schedules implemented using several frequency transform units from among a plurality of transform units which perform frequency transforms that differ from one another, a schedule conforming to results obtained at said calculation step;

the frequency transform being applied to the tile of interest in accordance with the schedule selected at said selection step.

32. A program stored on a computer-readable medium for executing the image processing method set forth in claim 31.

33. A computer-readable storage medium storing a computer-executable program for applying image processing to an image containing a region of interest, the program comprising:

a segmentation step of segmenting an image into tiles of a prescribed size;

a frequency transform step of applying a frequency transform, which conforms to a proportion of the region of interest contained in a tile of interest, to the tile of interest;

a component transform step of applying a component transform to transform coefficients contained in the tile of interest that has been subjected to the frequency transform at said frequency transform step; and an inverse frequency transform step of applying a transform, which is the inverse of the frequency transform performed at said frequency transform step, to the tile of interest that has been subjected to the component transform at the component transform step;

wherein said frequency transform step includes:

a calculation step of calculating proportion of the region of interest contained in the tile, of interest; and a selection step of selecting, from a plurality of frequency transform units which perform frequency transforms that differ from one another, a frequency transform unit conforming to results obtained at said calculation step;

the frequency transform being applied to the tile of interest using the frequency transform unit selected at said selection step.

34. A computer-readable storage medium storing a computer-executable program for applying image processing to an image containing a region of interest, the program comprising:

a segmentation step of segmenting an image into ties of a prescribed size;

a frequency transform step of applying a frequency transform to a tile of interest in accordance with a frequency transform schedule that conforms to a proportion of the region of interest contained in the tile of interest;

a component transform step of applying a component transform to transform coefficients contained in the tile of interest that has been subjected to the frequency transform at said frequency transform stop; and an inverse frequency transform step of applying a transform, which is the inverse of the frequency transform performed at said frequency transform stop, to the tile of interest that has been subjected to the component transform at said component transform step;

wherein said frequency transform step includes:

a calculation step of calculating proportion of the region of interest contained in the tile of interest; and a selection step of selecting, from frequency-transform schedules implemented using several frequency transform units from among a plurality of transform units which perform frequency transforms that differ from one another, a schedule conforming to results obtained at said calculation step;

the frequency transform being applied to the tile of interest in accordance with the schedule selected at said selection step.

* * * * *

UNITED STATES PATENT AND TRADEMARK OFFICE
CERTIFICATE OF CORRECTION

PATENT NO. : 6,975,753 B2
APPLICATION NO. : 09/948660
DATED : December 13, 2005
INVENTOR(S) : Tomohiko Matsuura et al.

It is certified that error appears in the above-identified patent and that said Letters Patent is hereby corrected as shown below:

On the title page: Item (56) References Cited:
    Other Publications, "No. 4, Oct." should read --No. 4 (Oct.--.

Sheet 1:
    FIG. 1, 115, "SEGMANTATION" should read --SEGMENTATION--.
    FIG. 1, 116, "TARANSFORM" should read --TRANSFORM--.

COLUMN 3:
    Line 57, "is" should be --is a--.

COLUMN 5:
    Line 16, "the" should read deleted.

COLUMN 6:
    Line 60, "onedimen-" should read --one-dimen- --.

COLUMN 9:
    Line 58, "a" should be deleted.

COLUMN 10:
    Line 30, "that" should read --that are--.

COLUMN 11:
    Line 16, "difference," should read --different,--.
    Line 40, "efficiency" should read --efficient--.
    Line 49, "executes" should read --executed--.
    Line 53, "changes" should read --changed--.

COLUMN 15:
    Line 67, "presented" should read --prescribed--.

COLUMN 16:
    Line 15, "die" should read --tile--.

COLUMN 17:
    Line 55, "image; wherein" should read --image; ¶ wherein--.

UNITED STATES PATENT AND TRADEMARK OFFICE
CERTIFICATE OF CORRECTION

PATENT NO.        : 6,975,753 B2
APPLICATION NO. : 09/948660
DATED             : December 13, 2005
INVENTOR(S)      : Tomohiko Matsuura et al.

It is certified that error appears in the above-identified patent and that said Letters Patent is hereby corrected as shown below:

<u>COLUMN 18</u>:
    Line 56, "ties" should read --tiles--.

<u>COLUMN 19</u>:
    Line 39, "tile," should read --tile--.

<u>COLUMN 20</u>:
    Line 10, "ties" should read --tiles--.
    Line 20, "stop;" should read --step;--.
    Line 24, "stop," should read --step,--.

Signed and Sealed this

Ninth Day of January, 2007

JON W. DUDAS
*Director of the United States Patent and Trademark Office*